Figure 1:
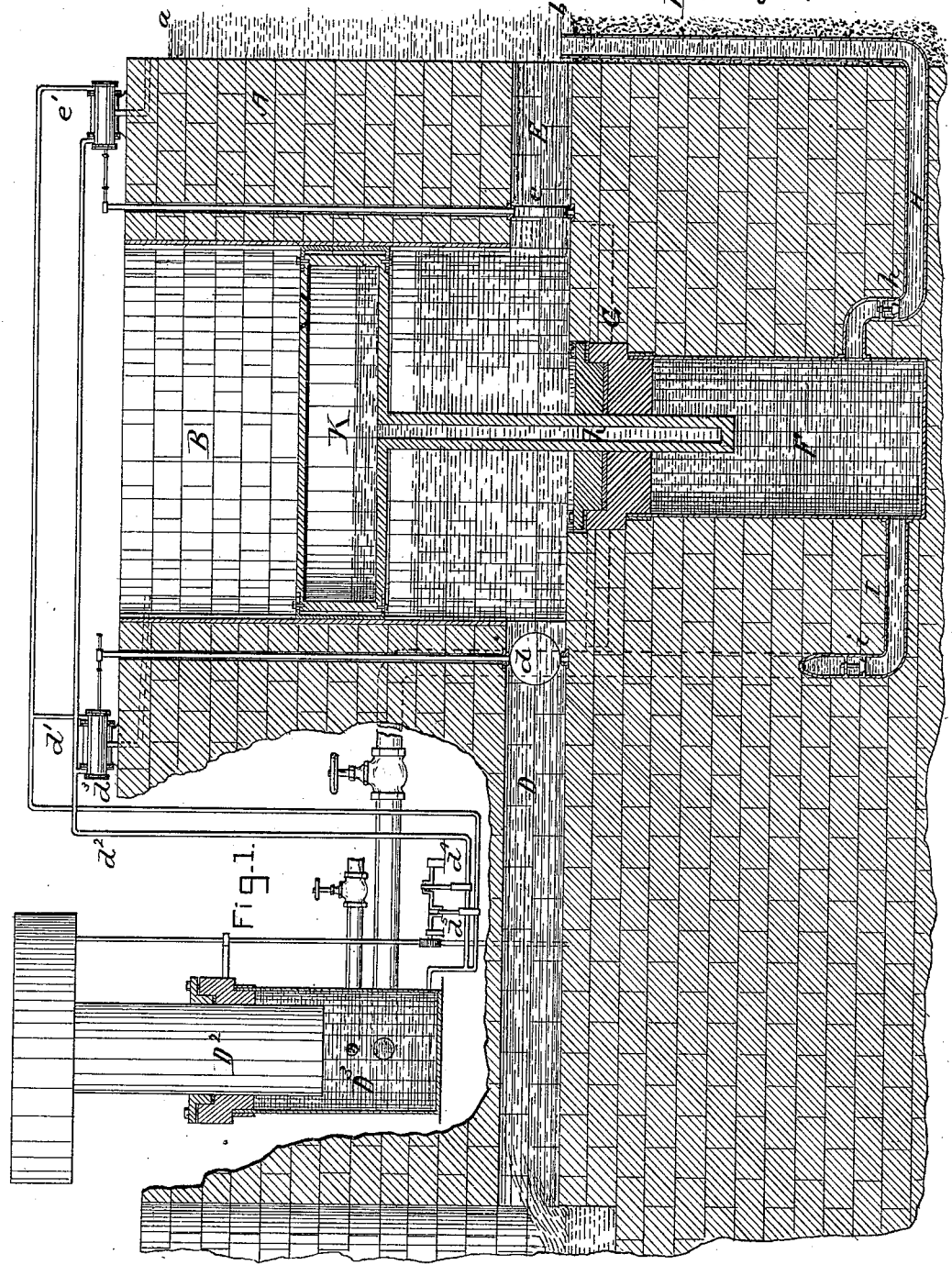

(No Model.) 2 Sheets—Sheet 1.

J. H. HAGERTY.
WATER MOTOR.

No. 344,960. Patented July 6, 1886.

Witnesses
J. M. Dolan
Fred. B. Dolan

Inventor
John H. Hagerty
by his attys
Clarke & Raymond

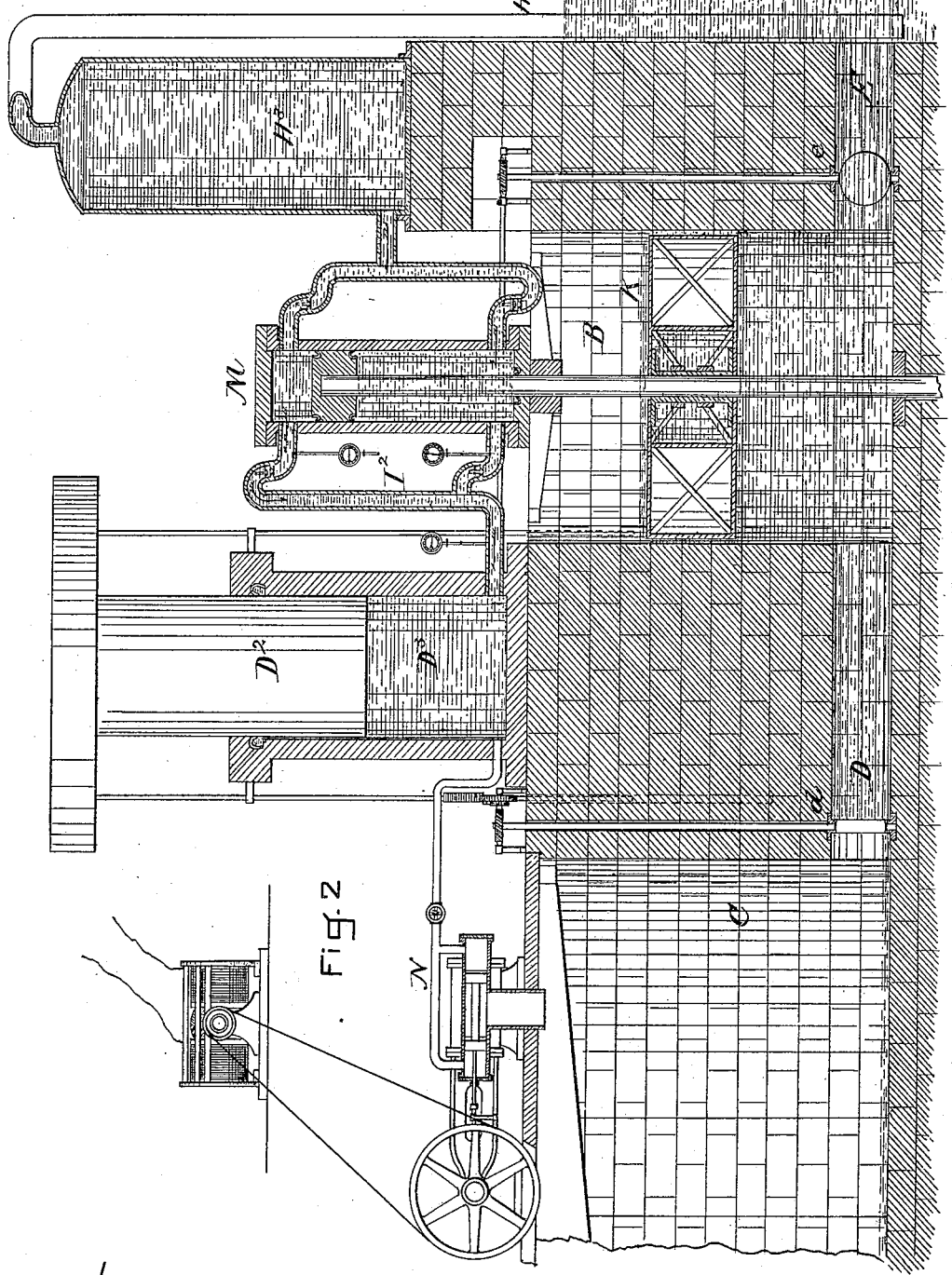

UNITED STATES PATENT OFFICE.

JOHN H. HAGERTY, OF LOWELL, MASSACHUSETTS.

WATER-MOTOR.

SPECIFICATION forming part of Letters Patent No. 344,960, dated July 6, 1886.

Application filed November 9, 1885. Serial No. 182,228. (No model.)

*To all whom it may concern:*

Be it known that I, JOHN H. HAGERTY, of Lowell, in the county Middlesex and State of Massachusetts, a citizen of the United States, have invented a new and useful Improvement in Water-Motors, of which the following is a full, clear, and exact description, reference being had to the accompanying drawings, forming a part of this specification in explaining its nature.

This invention relates to a means of utilizing moderate heads of water, particularly tidal heads, for the purpose of obtaining power.

In the drawings, Figure 1 is a view, partly in section and party in elevation, of an apparatus constructed according to this invention. Fig. 2 is a modified form of the apparatus embodying the same principle.

Like letters represent like parts in both figures.

In Fig. 1 between $a$ and $b$ is supposed to be a water-space, in which tide-water rises and falls, the highest level being at $a$ and the lowest at $b$. A masonry wall, A, is erected along the border of the water, and a pit, B, is made in the bank or shore at a short distance from the water, a second pit of much greater size being made at C, a short distance off. The two pits, B and C, are connected by a channel or passage, D, which is controllable by a valve, $d$. Another passage, E, leads from the water-space into the pit B at a low level, and is controlled by the valve $e$. Beneath the pit B is a smaller pit, F, the same being bushed at its top with a stuffing-box, and communicating with the water-space outside by the pipe H, controlled by a check-valve, $h$, and with a reservoir, $D^3$, by another passage, I, controlled by a check-valve, $i$. The valve $h$ opens toward the pit F, and the valve $i$ opens from it. A float, K, having a plunger, $k$, below it, which plunger $k$ fits tightly the stuffing-box G, is placed in the pit B, and the plunger extends into the pit F through the stuffing-box G. If, now, the water is at the head $a$, the float K at its lowest position, and the plunger $k$ of course at its lowest position, the valve $e$ opened and the valve $d$ shut, and the float and the plunger together weigh a little less than water, which can readily be accomplished by making them hollow and loading them with water or other load, and water be admitted through the pipe E, the plunger and float will be buoyed upon the surface of the water, and will rise to the top of the pit to a level with the water outside, drawing in some water through the pipe H, which runs to the low level of water in the sea or river through the bed of the sea or river. (Indicated at L.) The valve $e$ being now shut and the valve $d$ opened, the water beneath the float K will run off into the larger reservoir, C, which should be of sufficient size to hold all the water necessary to be used during a tide, and to readily be emptied into tide-water at low tide, and as the water runs off into the pipe D past the valve $d$ the plunger $k$ and its float K will fall, exercising the pressure due to its weight upon the water in the pit F, and will force it out through the check-valve $i$ into the reservoir. This operation being repeated will serve to pump water.

The water raised into the reservoir $D^3$ may be used for any purpose for which it is desirable to use water which has been pumped to a higher level than that which it occupied before it was pumped, and for which its quality, quantity, and head may be suitable.

The reservoir C, for the waste, must be many times larger than the pit in which the plunger plays. The height to which the float rises will be regulated and governed by the height of the water from which the supply comes. As this falls the upward stroke of the float and plunger will be shortened. As the water in the waste-reservoir C rises the downward stroke will be shortened. The speed of the strokes will be greater when the plunger is raised highest and the waste-reservoir C is least full, because the water will run off from below the float faster in such cases. In case the level of water in the waste-reservoir C should rise to the height of the source of supply, which might be the case at half-tide or so, there would be an intermission of pumping; but with a proper size of waste-reservoir C the work of pumping could be continued from full tide to half-tide, or even further. Of course the size of inlet and eduction pipes from beneath the float K would affect the speed of work.

The reservoir $D^3$ is illustrated for the purpose of moving the valves in pipes $d^2$ $d^3$ as a stand-pipe with a delivery as well as a force main. In this the fluctuations of head in the stand-pipe affect the position of the float $D^2$, raising or lowering it. A rod having a rack on its lower end operates a double-valve motion, which controls the valves of pipes $d^2$ $d^3$, and thereby throws the valves of the motors, which motor-valves control the induction and exhaust of the cylinders of the motors; but as the details of these motors are not to be claimed in this application, nor the motors themselves necessary to the working of the valves in pipes D and E, which can be done by hand, and as persons acquainted with the valve mechanism of double-acting steam-pumps can readily devise the valve mechanism of these motors, it is not further described herein.

The valves $d$ $e$ may be moved by hand, and for the purpose of this application this is all that is necessary; or two small motors may be employed to actuate these valves, as indicated in Fig. 1. These motors are lettered, respectively, $d'$ $e'$, and the stroke of the motor in one direction opens the valve by an ordinary crank-action, and in the other shuts it. The water for these two motors $d'$ $e'$ is supplied by pipes $d^2$ $d^3$, which are governed by valves $d^4$ $d^5$, and these valves are worked by the rise and fall of a plunger, $D^2$, in a cylinder, $D^3$, which is actuated by the water thrown by the descent of the plunger $k$ in any familiar way of working the valves of direct-acting steam-pumps. This method of automatically operating the valves $d$ $e$ by a portion of the water raised is, however, no essential part of this invention.

In Fig. 2 is shown a modification of this device. The pit B and its connecting-pipes D and E and relieving-pit C are all substantially similar to those shown in the drawings, Fig. 1; but in lieu of a single-acting plunger-pump there is a double-acting piston-pump, M, placed above the float K and actuated from it. The water to be forced is drawn through the pipe $H^2$ into the reservoir $H^3$, and thence in the piston-pump M, from which, through the pipe $I^2$, it is forced into the cylinder $D^3$, in which is the plunger $D^2$. A water-motor, N, of any proper form, is employed to utilize the power obtained by this apparatus, and it can readily be seen that the pressure upon this motor can be made very great, and that high speeds can be obtained, the power obtainable being such as is due to the weight of the float K and its fall in feet. The part designated as pump M, with its induction and eduction pipes and valves, is obviously a mere substitution of a double-acting piston-pump for its exact mechanical equivalent as a water-raising engine—the plunger-pump K F, with its induction and eduction pipes and valves.

This apparatus is in substance a contrivance for converting the foot-pounds of a large quantity of water of small head into the foot-pounds of a smaller quantity of water with a larger head, by means of a force-pump actuated by a float of comparatively great area, weight, and buoyancy.

In proportioning the size and weight of parts it will be remembered that the area of the plunger $k$ being greater than that of the pipe leading to the reservoir the pressure to hold up the plunger and float will be as many times the weight of the water in the pipe leading to the reservoir as the area of the plunger $k$ is times the area of the pipe to the reservoir. The combined weight of float and plunger must exceed this. The area of the float must be sufficient to give it buoyancy when valve $e$ is open and valve $d$ is shut.

The float and plunger of Fig. 1 are shown hollow, and in order to regulate their weight and buoyancy may be loaded with water.

It is obvious that this apparatus without the reservoir is a pump adapted to raise water from one level to another without storing it, and is intended to be so used.

I claim as my invention and desire to secure by Letters Patent of the United States—

1. The combination, with a source of water-supply and a drainage-area, C, of considerable size, of the pits B F, channels D E, valves $d$ $e$, draft and force mains, and float and plunger K $k$, proportioned to each other and to the work to be done, substantially as described.

2. The combination of the source of water-supply, drainage-area, draft and force mains, pits B F, channels D E, valves $d$ $e$, float and plunger K $k$, with the reservoir $D^3$, substantially as described.

JOHN H. HAGERTY.

Witnesses:
JAS. H. CARMICHAEL,
JOHN A. GILBRIDE.